March 3, 1970    G. L. TYLER, JR    3,498,690
HOLOGRAPHIC STORAGE SYSTEM
Filed Nov. 21, 1966

INVENTOR.
GEORGE L. TYLER, JR
BY *Samuel Lindenberg*
*Arthur Frielich*
ATTORNEYS

United States Patent Office 3,498,690
Patented Mar. 3, 1970

3,498,690
HOLOGRAPHIC STORAGE SYSTEM
George L. Tyler, Jr., Stanford, Calif., assignor to Research Corporation, New York, N.Y., a nonprofit corporation of New York
Filed Nov. 21, 1966, Ser. No. 595,813
Int. Cl. G02b 27/00
U.S. Cl. 350—3.5                     6 Claims

ABSTRACT OF THE DISCLOSURE

The data on a document may be recorded on film, using holographic techniques in a minimum of space on said film. This is done by using a mask, placed adjacent the film, having a slit therein the length of which is at least on the order of the length of the document to be recorded, and the width is on the order of several microns in order to permit recording only in a single dimension.

---

The invention described herein was made in the performance of work under a NASA contract and is subject to the provisions of Section 305 of the National Aeronautics and Space Act of 1958, Public Law 85–568 (72 Stat. 435; 42 USC 2457).

This invention relates to an improved system for storing information employing holographic techniques.

With the advent of a laser, which provides a readily achievable coherent light source, it has become possible to make holographic photographs. These are made by exposing a photographic negative to both the light from the coherent light source directly and the light reflected from the object being photographed, which is illuminated by that light source. Thus a recording is made without using lenses.

Data storage by direct photography of documents usually is accomplished by photographing the light reflected from the document through reducing lenses whereby the film record is considerably smaller than the actual document. When it is desired to reproduce the photographed document, the reverse process, using lenses is required. This microfilming technique employs expensive optical systems.

An object of this invention is the provision of a holographic microrecording technique which does not require expensive lenses in either the recording or the reproduction process.

Yet another object of this invention is the provision of a novel microrecording data storage technique.

Still another object of the present invention is the provision of a novel data storage system employing holographic techniques.

These and other objects of the present invention may be achieved in an arrangement whereby a document to be photographed, in accordance with this invention, is illuminated by light from a coherent light source. The light reflected from the document, together with the light from a reference source of the light, is directed at a mask having a slot aperture behind which aperture is the film upon which the recording is to take place. The document is positioned orthogonal to the film plane. Since the slot width is on the order of several microns, and in view of the edgewise position of the document relative to the film, there is a considerable reduction between the size of the document and the amount of film space required for recording it.

For reproducing the document which has been recorded in the manner described, a coherent light source is employed and the light is directed through a slit aperture. The light to illuminate the recording on the film, which then projects a real image of the original document on the opposite side of the film with the same dimensions and at the same location with respect to the film, as the original.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

It is elementary in optics that the resolution transverse to the optic axis of an imaging system depends on the size of the system aperture in wavelengths. In addition, there exists in a focussed image a longitudinal resolution associated with the focussing itself. For a two-dimensional aperture, the definition of the image along the optic axis depends on the focal length of the system and the aperture size. Thus, an imaging system with a two-dimensional aperture actually recreates a three-dimensional image. Focussing a camera corresponds to placing the image of the subject on the film plane. If a lens is made to image through a one-dimensional aperture by placing a slit just behind the lens, resolution is completely lost in the direction orthogonal to the plane formed by the slit and the optic axis and is degraded somewhat in the other two directions. In principle, however, if the length of the slit is at least as large as the distance of the furthest object point from the film, then no resolution is lost in these other two dimensions. If the slit is too short, resolution is lost in only one of the two dimensions, namely in the depth dimension normal to the film plane. It is easy to show that the image has been integrated in the direction transverse to the slit. For the special case of a planar object parallel to the slit, very litle is lost since the brightness distribution of the image in the plane corresponding to the object is essentially preserved. In accordance with this invention, the planar object which is presented orthogonal to the slit is a document containing data desired to be stored.

Figure 1:
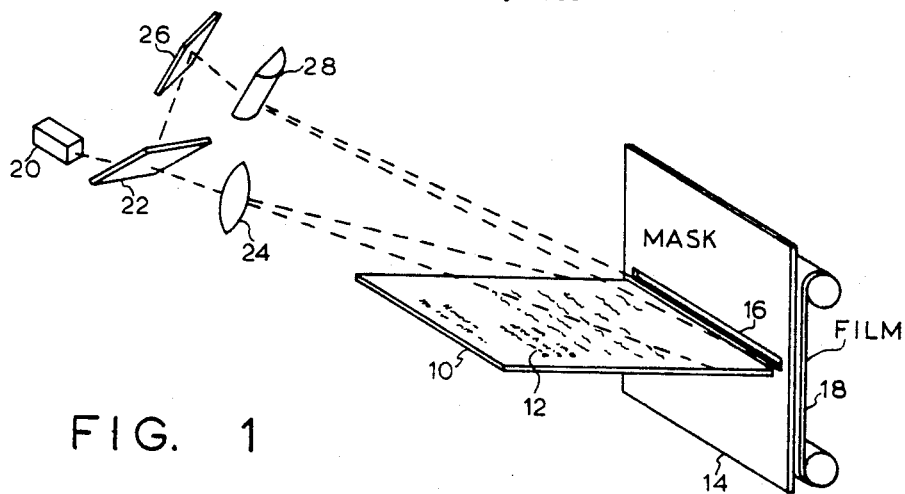
FIGURE 1 is a schematic representation in perspective of an arrangement for recording data on film in accordance with this invention.
Figure 2:
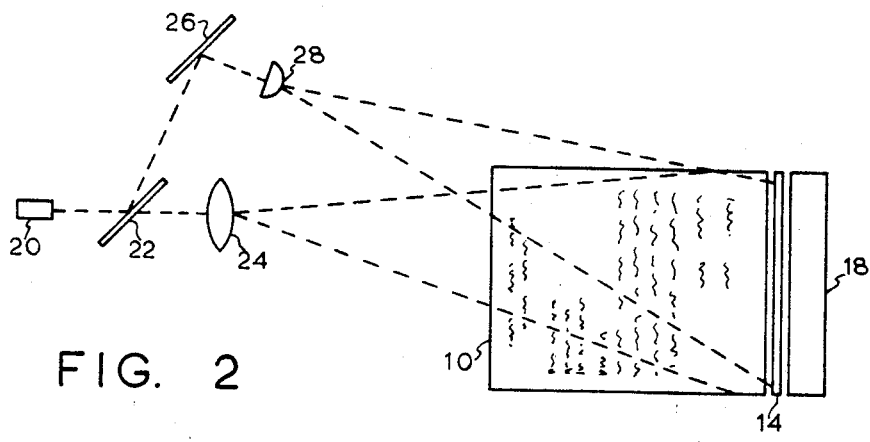
FIGURE 2 is a view in elevation of the arrangement shown in FIGURE 1.

Referring now to FIGURES 1 and 2, there is shown a schematic representation of an embodiment of this invention in perspective and in elevation. A document 10, containing data 12, on its surface, is placed orthogonal to the plane of a mask 14 having a slot 16 therein. Behind the mask and preferably in contact therewith is film 18 on which the holographic recording is to be made. The film may be placed in contact with one side of the mask and the edge of the document preferably abuts the other side of the mask with the surface on which data is recorded being level with the slot 16, although it may be lower than the slot, and in front of the mask 14. In short, the placement of the document relative to the slot should be such that the light scattered from the surface of the document enters the slot.

A source of coherent light 20, which may be a laser, is placed to one side and above the document. The light beam emitted from the laser is split by a half-silvered mirror 22 and a portion of the beam passes through a lens 24. The lens directs the light at the surface of the document, and not into the slot of the mask. The other portion of the coherent light beam is reflected to a side and to a mirror 26 which redirects the light through a cylindrical lens 28, into the slot 16 and not at the document. The lens 28 forms the light into a fan shaped beam slot 16 is illuminated by scattered light from the document and light directly from the laser which serves as a reference light source.

From the foregoing description it should be recognised that the system described is one for producing a hologram wherein the film 18 records the phase difference between the light which reaches it directly from the source 20 and the scattered light from the document 10. The width of the slot 16 should be as small as possible, on the order of wavelengths of light, however, there are practical limitations on this, which are determined by the ability to enable sufficient light to pass therethrough both for enabling recording on film as well as to enable subsequent readout of the data recorded on the film. Thus, by way of example, the dimension of the slit in an embodiment of this invention, which was built and operated, was 20 microns. The reason for first deflecting the light beam which illuminates the slit, to one side, and then back into the slot is that this renders it easier to prevent this light from illuminating the document. This light beam must only illuminate the slit.

Figure 3:
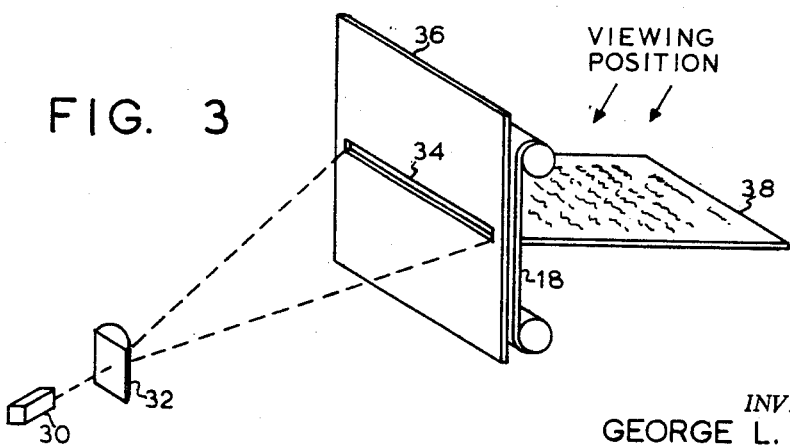
FIGURE 3 represents a schematic system in perspective for reproducing a document which has been recorded, using the techniques of this invention.

FIGURE 3 shows an arrangement for recreating data which has been recorded on the film 18. A monochromatic coherent light source, such as the laser 30, has its light directed at a cylindrical lens 32 which emits a fan shaped beam for illuminating the slit 34 in a mask 36. The mask 36 is substantially identical with the mask 14 in FIGURE 1. The light passes through the slit, then passes through the holographic image on the film 18, and reproduces at the same location relative to that film plane as the location of the document when the photograph was originally made, an image 38, of the document and the data which was recorded thereon. This image may be photographed by placing another sensitized surface at the location shown, or may be viewed directly, or may be projected upon a screen upon which it may be viewed.

It should be appreciated that a substantial amount of data on a substantial sized document is recorded in a strip of film which may have the same width as the document, but the length of the recording is on the order of wavelengths and is somewhat less than the width of the slit which is 20 microns. Accordingly, this invention provides an arrangement for high density storage of documents. Those skilled in the art will readily appreciate how to automate the storage process whereby successive documents are brought to the location at which they may be photographed onto the film through the slit 16. The laser light is switched on and off for the photograph. The film is then indexed to provide a fresh surface at the slot. Simultaneously with the photographing of the documents some indicia may be either be photographed or notched into the film whereby, upon a subsequent search, the indicia indicates the location of the desired document. Those skilled in the art will also appreciate how a search may be made over a film 18 upon which a large number of such documents have been recorded, until the holograph of the desired document, as indicated by its indicia is positioned adjacent the slot in the mask.

There has accordingly been described and shown herein a novel and useful arrangement for storing data within a strip which is only a few wavelengths wide.

What is claimed is:

1. A system for recording data displayed over a surface, on a photosensitive layer which is spaced from said surface, said system comprising:
   a mask having a slit aperture means for restricting to substantially one dimension the recording of data from said surface onto said photosensitive layer through said slit means, said mask being positioned between said photosensitive layer and said surface, and said mask being directly adjacent to said photosensitive layer, said surface being orthogonal to said mask;
   coherent light means;
   first means for directing light from said coherent light means directly at said slit; and
   second means for directing light from said coherent light means at said surface for illuminating said surface in a manner to cause scattered light therefrom to enter said slit aperture, whereby said photosensitive layer records through said slit the interference pattern between the light directly received from said first means and the light scattered from said surface.

2. Apparatus as recited in claim 1 wherein the width of said slit in said mask is on the order of several microns.

3. Apparatus as recited in claim 1 wherein said coherent light means includes a laser light source for establishing a primary light beam;
   means for splitting said primary light beam into a first and second light beam;
   said first means for directing light from said coherent light means includes a mirror for directing said first light beam towards said slit; and
   means for spreading the light from said mirror into a fan shaped light beam to illuminate said slit.

4. An improved method of making a hologram of a document having data on a surface thereof, by a photograph on film comprising:
   placing said film directly adjacent a mask having a slit therein which has a width dimension on the order of several microns;
   placing said document adjacent said mask on the side opposite said film to position the data bearing surface at said slit and orthogonal to the plane of said mask and film;
   illuminating said slit only from a coherent light source; and
   illuminating said document from said coherent light source whereby said film records the phase difference between light from said first source and reflected through said slit from said document.

5. A system for recording data displayed over a surface on a photosensitive layer which is spaced from said surface, said system comprising:
   a mask having a slit aperture means for restricting to substantially one dimension the recording therethrough of data on said photosensitive layer, said mask being positioned directly adjacent to said photosensitive layer and between said photosensitive layer and said data surface;
   means positioning said surface adjacent and substantially orthogonal to the plane of said slit;
   means establishing a reference wavefront light source;
   means for directing light from said reference wavefront light source directly at said slit;
   means establishing a surface illuminating light source; and
   means for directing light from said data surface illuminating light source at said surface to cause light scattered therefrom to enter said slit whereby said photosensitive layer records the interference pattern between light directly received from said reference light source and said light scattered from said surface.

6. A system for reproducing a hologram recorded on photographic film through a slit mask having a width dimension to permit the recordation on said film substantially only in a single dimension, said system comprising:
   a source of coherent light positioned on one side of said photographic film;
   a slit mask positioned between said coherent light source and said photographic film and directly adjacent said photographic film; the slit of said mask having substantially the dimensions of the slit in the mask used for recording; and
   means positioned between said coherent light source and said slit mask for illuminating the slit in said mask with light from said coherent light source whereby the light passing through said slit and said photographic film diverges to re-establish the object holographically recorded on said film.

References Cited

Gabor, Nature, vol. 208, No. 5009, October 1965, pp. 422–3.

Stroke et al., Jour. of the Optical Soc. of Am., vol. 55, October 1965, pp. 1327–8.

McCracken, NASA Summer Fellowship Program, January 1966, pp. 77–88.

DAVID SCHONBERG, Primary Examiner

RONALD J. STERN, Assistant Examiner